June 24, 1930.  C. G. DEAN  1,767,122

PORTABLE ELECTRIC WATER HEATER

Filed July 3, 1929

Inventor
C. G. Dean
By
Attorneys

Patented June 24, 1930

1,767,122

UNITED STATES PATENT OFFICE

CHARLES G. DEAN, OF MILWAUKEE, WISCONSIN

PORTABLE ELECTRIC WATER HEATER

Application filed July 3, 1929. Serial No. 375,743.

This invention relates to new and useful improvements in heaters and more particularly to a portable electric heater.

One of the objects of my invention is the provision of a small portable electric heater specially designed to be carried about in a small compact case and which will enable the drawing at frequent intervals of small quantities of hot water.

Another object of my invention is the provision of an electric heater wherein the cold water is introduced into the heater in such manner as to prevent the cold water from coming directly into contact with the hot water and thence produce a cooling effect on the hot water but provides for the circulation of the cold water so as to slowly heat the same before it reaches the direct heating chamber.

A further object of my invention is the provision of a comparatively small electric heater comprising a plurality of annular chambers so arranged so as to have the cold water circulate within the heater to gradually heat the same before it reaches the main heating chamber, so that there will always be a certain amount of hot water in the heater even after the introduction of an amount of cold water therein.

With the above and other objects in view the invention consists in the novel features of construction, the combination and arrangement of parts hereinafter more fully set forth, pointed out in the claims and shown in the accompanying drawings wherein:—

Figure 1:
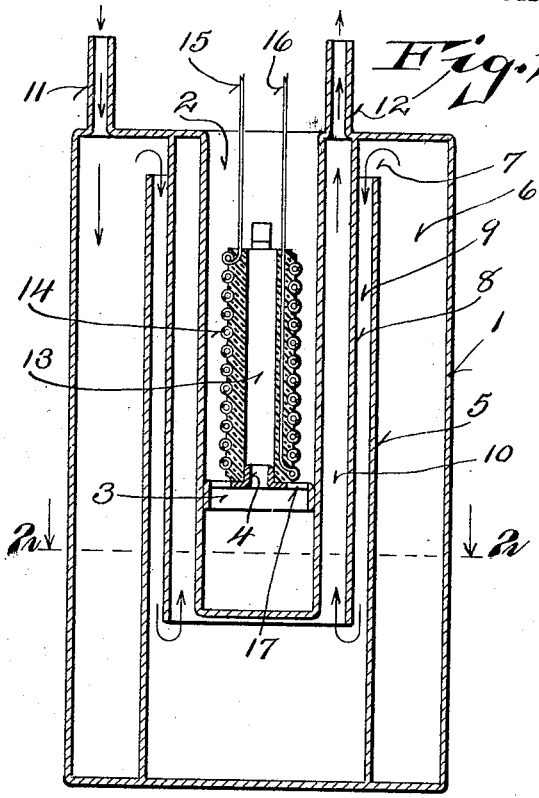
Figure 1 is a vertical sectional view of a portable electric heater constructed in accordance with my invention.
Figure 2:
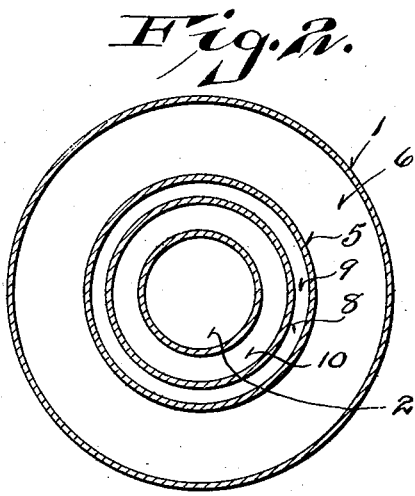
Figure 2 is a transverse section on the line 2—2 of figure 1.

In carrying out my invention, I preferably provide a cylindrical body 1, the top wall of which has a tubular inset part forming a chamber 2 which extends downwardly into the body 1 at a point below its transverse center. This chamber 2 is preferably used for supporting therein a heating element, the heating element being mounted upon a cylindrical bracket 3 which has a centrally disposed upstanding tubular stud 4. Extending upwardly from the bottom of the body 1 upon the inside thereof, is a cylindrical wall 5, this wall 5 extending upwardly to a point adjacent the top of the main water chamber, thus leaving a passage way 7 above the top of the wall 5. Extending downwardly from the top of the body to a point slightly below the lower end of the chamber 2 is a circular wall 8 which is slightly spaced from the wall 5 so as to form an annular passage 9, causing the fluid within the chamber 6 to flow through the passage 7 and then downwardly through the passage 9 upon the interior of the chamber formed by the wall 5.

As the walls of the chamber 2 and the wall 8 are placed over each other they form an annular chamber 10 which brings the water into close proximity to the heating chamber 2, so that the heating element in the chamber 2 will readily heat the water in the annular chamber 10.

The top of the tank is provided with an inlet in the form of a tube 11, having communication through the top with the interior of the chamber 6 whereby the cold water is introduced into the heater. The outlet comprises a tube 12, the passage of which extends through the top of the body 1 and communicates with the chamber 10 whereby the hot water may be readily drawn from the container.

Any suitable type of electric heating element may be positioned within the chamber 2 for heating the water in chamber 10, but in the present instance I have illustrated a tubular core 13 of insulating material having a coil 14 wound around the same and partially embedded within the outer surface of the core. This coil is connected at one end with a conductor 15 and at the other end with conductor 16 for supplying a source of current to the coil. The coil is maintained in an upright position by having its lower end engaged with the tubular stud 4 on the shelf or bracket 3. It will be noted that this shelf or bracket 3 is provided with suitable openings 17 to permit the heat from the heater to pass downwardly into the bottom portion of the chamber 2 so as to heat as much surface of the walls of the chamber 2 as possible.

It will be apparent from the foregoing that by providing a heater of this type that the oppositely extended walls 5 and 8, will provide oppositely arranged chambers so that the cold water which is introduced into the chamber 6 will have to flow through the chamber 9, before reaching the chamber 10. As the chamber 10 contains the hot water, it will be apparent that the wall 8 will be heated to a certain degree thus removing the chill from the water as it flows through the chamber 9. This circulation of the water will prevent the cold water coming in direct contact with the hot water and reducing the temperature of the same so that the heater, during the time the heating element is in operation will contain a certain amount of hot water at all times.

Figure 3:
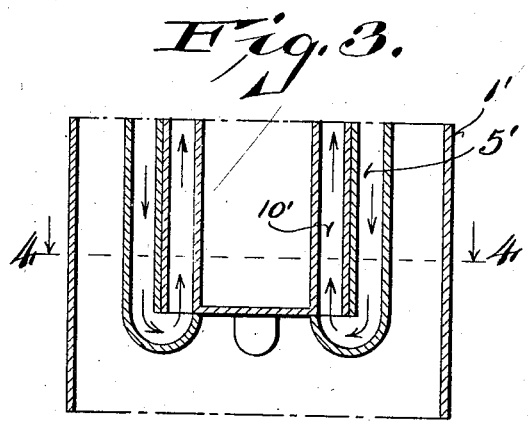
Figure 3 is a detailed vertical section illustrating a slightly modified form of the invention.
Figure 4:
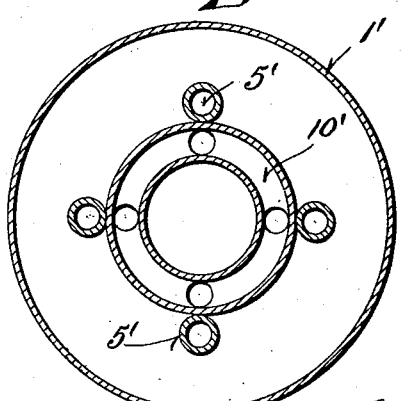
Figure 4 is a horizontal section on the line 4—4 of figure 3.

In Figures 3 and 4 I have illustrated a slightly modified form of the invention wherein the wall 5 is omitted and in place thereof I provide a number of tubes 5' which replaces the chamber 9, these tubes connecting at their lower ends with the chamber 10, so that the water entering the body 1' will be caused to circulate in a manner similar to the circulation in the preferred embodiment of the invention so as to prevent direct contact of the cold water with the hot water before it has been slightly heated.

It will be apparent from the foregoing that I have provided a simple and inexpensive portable heater of the character set forth whereby a certain amount of hot water can be readily drawn from the heater and the water introduced into the heater is caused to circulate in such a manner as to provide for heating the water in a minimum time.

While I have shown and described the preferred embodiment of my invention, it will be apparent that slight changes may be made in the construction when putting the invention into practice without departing from the spirit of the same or the scope of the appended claims.

I claim:

1. A device of the class described including a body forming a water receiving chamber, an inset portion extending inwardly from the top thereof to form a centrally disposed heating chamber with its inner end extending beyond the horizontal center of the body, an annular wall extending inwardly from the bottom of the body to a point adjacent the top and spaced from the outer wall of the body, a second annular wall extending inwardly from the top to a point slightly beyond the inner end of the inset portion and spaced from the first annular wall, the second wall being disposed between the heating chamber and the first annular wall to provide an indirect passage between the water receiving chamber and the heating chamber, and a heating element arranged in the heating chamber.

2. A device of the class described, a body forming a water receiving chamber having an inlet, an inwardly extending portion projecting into the body from the top thereof, a heating chamber having an outlet, oppositely disposed walls extending from the top and bottom of the body and spaced from each other and from the body wall, said oppositely disposed walls also being spaced from the heating chamber and having their ends spaced from the bottom and top respectively of the body to form oppositely disposed passageways between the heating chamber and water receiving chamber to cause circulation of the water from the receiving chamber to the heating chamber.

In testimony that I claim the foregoing I have hereunto set my hand at Milwaukee, in the county of Milwaukee and State of Wisconsin.

CHARLES G. DEAN.